(12) United States Patent  (10) Patent No.: US 8,394,482 B2
Chou                        (45) Date of Patent:    Mar. 12, 2013

(54) MOUSE PAD

(75) Inventor: Hung-Jen Chou, New Taipei (TW)

(73) Assignee: Hades-Gaming Corporation, New Taipei (TW)

( * ) Notice: Subject to any disclaimer, the term of this patent is extended or adjusted under 35 U.S.C. 154(b) by 114 days.

(21) Appl. No.: 13/076,769

(22) Filed: Mar. 31, 2011

(65) Prior Publication Data

US 2011/0244168 A1    Oct. 6, 2011

(30) Foreign Application Priority Data

Apr. 6, 2010 (TW) ................................ 99206038 U

(51) Int. Cl.
B32B 7/12      (2006.01)
B32B 3/00      (2006.01)
A47G 29/00     (2006.01)

(52) U.S. Cl. ........................ 428/71; 248/346.01; 428/68

(58) Field of Classification Search ..................... 428/71, 428/68; 248/346.01
See application file for complete search history.

(56) References Cited

U.S. PATENT DOCUMENTS 3,414,995 A * 12/1968 Adiletta et al. ................ 38/140

* cited by examiner

Primary Examiner — Brent O'Hern
(74) Attorney, Agent, or Firm — Chun-Ming Shih; HDLS IPR Services

(57) ABSTRACT

A mouse pad includes a fabric and a flat pad. The pad has an upper surface and a lower surface corresponding to each other, and an edge is along the periphery of the upper and lower surfaces. The fabric is smoothly and flatly covered on the upper surface, the lower surface, and the edge smoothly and flatly. Thus, by completely covering the upper surface, the lower surface and the edge of the pad, formation of deckle edge or falling off of the fabric to expose the product defect due to lack of durability.

1 Claim, 4 Drawing Sheets

MOUSE PAD

CROSS-REFERENCE TO RELATED APPLICATIONS

None.

BACKGROUND

1. Technical Field

The present invention relates to a computer peripheral accessory. More particularly, the present invention relates to a mouse pad applied to computer operation.

2. Related Art

The conventional mouse pad is designed according to a mouse having a trace ball. The mouse pad is used to help roll the trace ball to a precise position during operation, and for the trace ball to work properly, the mouse pad in the early stage is usually made of a hard material. Nowadays the mouse is upgraded to optical without the trace ball, the material selected to make the mouse pad is altered to a soft fabric with better texture and comfort.

The commonly used mouse pads have the same structure including combination of an upper layer and a lower layer, and the material of the upper layer is fabric. However, the conventional mouse pad only has a fabric coating on the surface, and since the mouse pad has the upper fabric layer and the lower foam layer, the fabric edge easily turns rough that affect the outlook of the mouse pad. When moving the mouse on the mouse pad, the fabric edge usually is squeezed to cause the deckle edge or even to fall off to expose the product defect due to lack of durability.

BRIEF SUMMARY

The present invention provides a mouse pad including a pad and a fabric attached on a surface of the pad. The fabric is smoothly and flatly attached to the surface of the pad by a thermo-compression bonding process. Furthermore, the fabric smoothly covers the edge of pad to avoid formation of deckle edge to affect the appearance of the pad and expose the product defect due to lack of durability.

The present invention provides a mouse pad comprising a fabric and a flat pad. The pad comprises an upper surface and a lower surface corresponding to each other. A flange is formed along the periphery of the upper surface and the lower surface. The fabric smoothly and flatly covers the upper surface, the lower surface and the flange of the pad. By completely covering the upper surface, the lower surface and the flange of the pad, formation of the deckle edge that may affect the appearance may be avoided. Furthermore, by covering the pad using the fabric, falling off of fabric may be avoided due to squeezing due to pulling effect.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
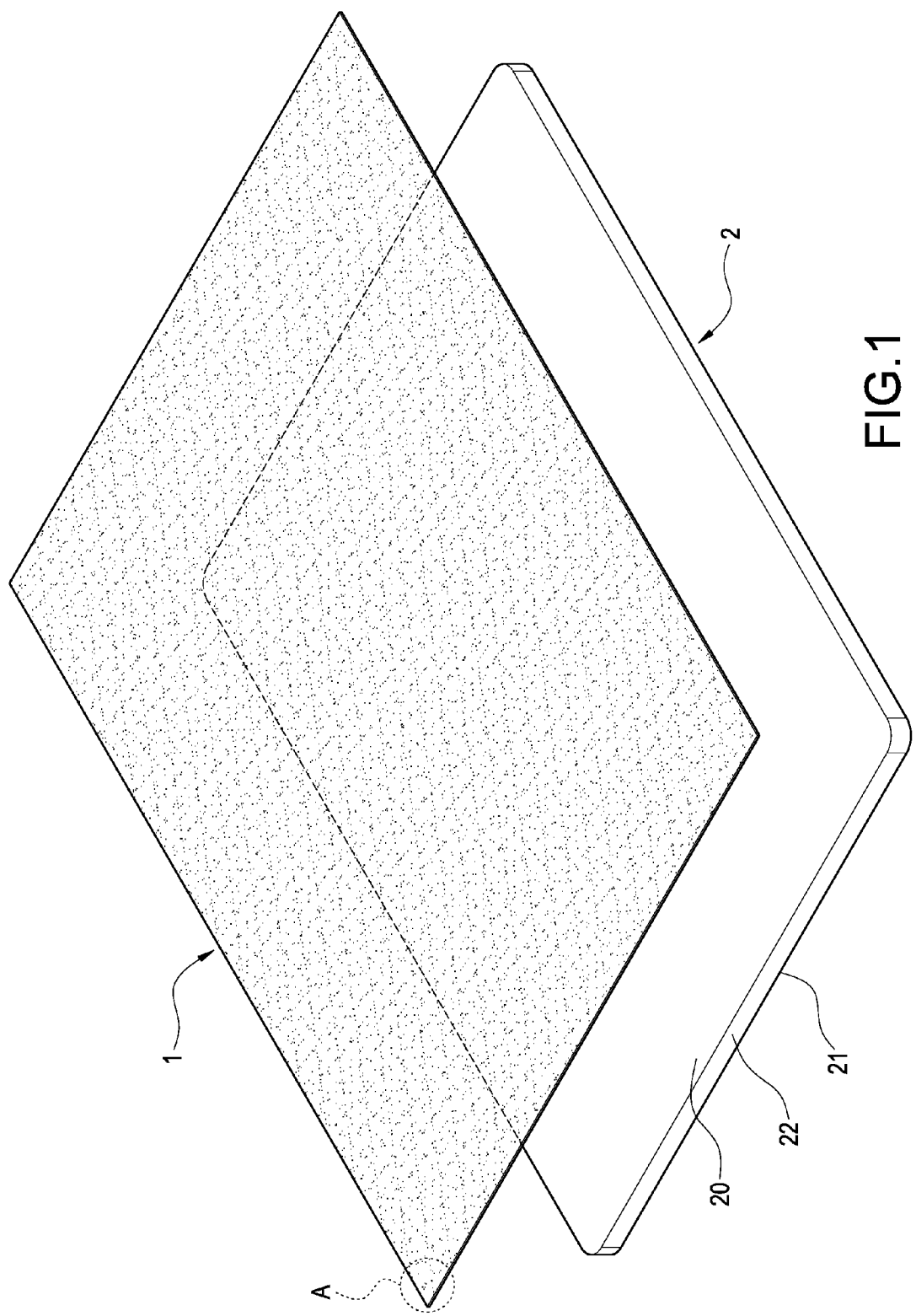
FIG. 1 is an exploded view of the present invention.

FIG. 1, an exploded view of a mouse pad according to an embodiment of the present invention, which includes a fabric 1 and a pad 2.

Figure 2:
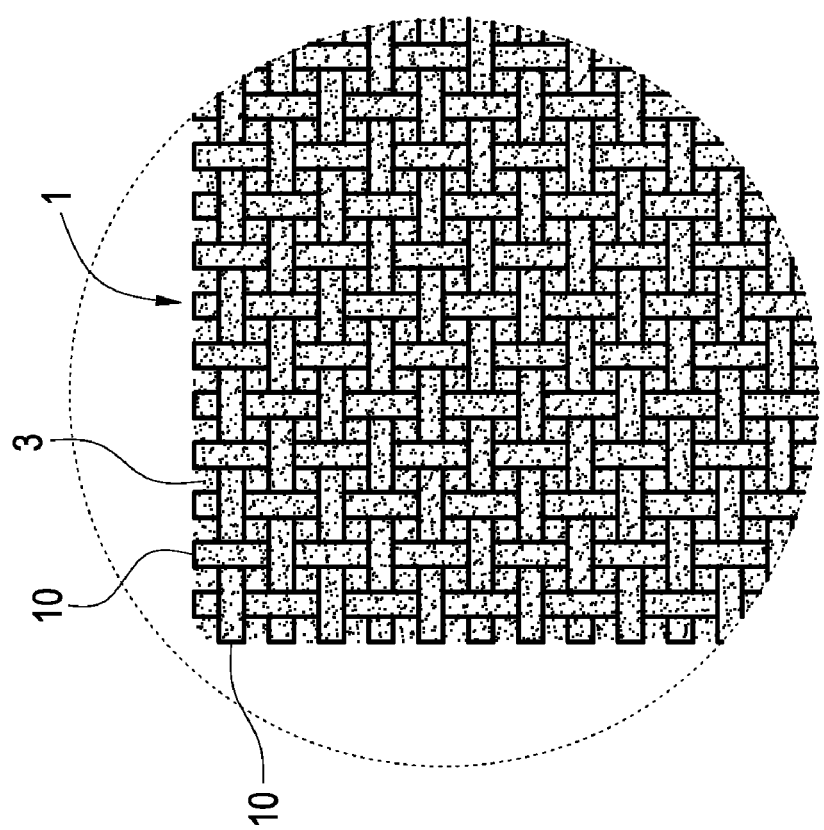
FIG. 2 is an enlarged view taken along the portion A of FIG. 1.

The fabric 1 can be a thermal contraction fabric, which may be knitted by a yarn 10 comprised of a thermal contractible polymer as illustrated in FIG. 2 including the effect of stretching when subjected to heat.

The pad 2 may be made of a material selected from a foaming material or solid silicon in a shape of a flat piece. The pad 2 comprises an upper surface 20 and a lower surface 21 corresponding to the upper surface 20, and an edge 22 is formed at the periphery of the upper surface 20 and the lower surface 21.

Figure 3:
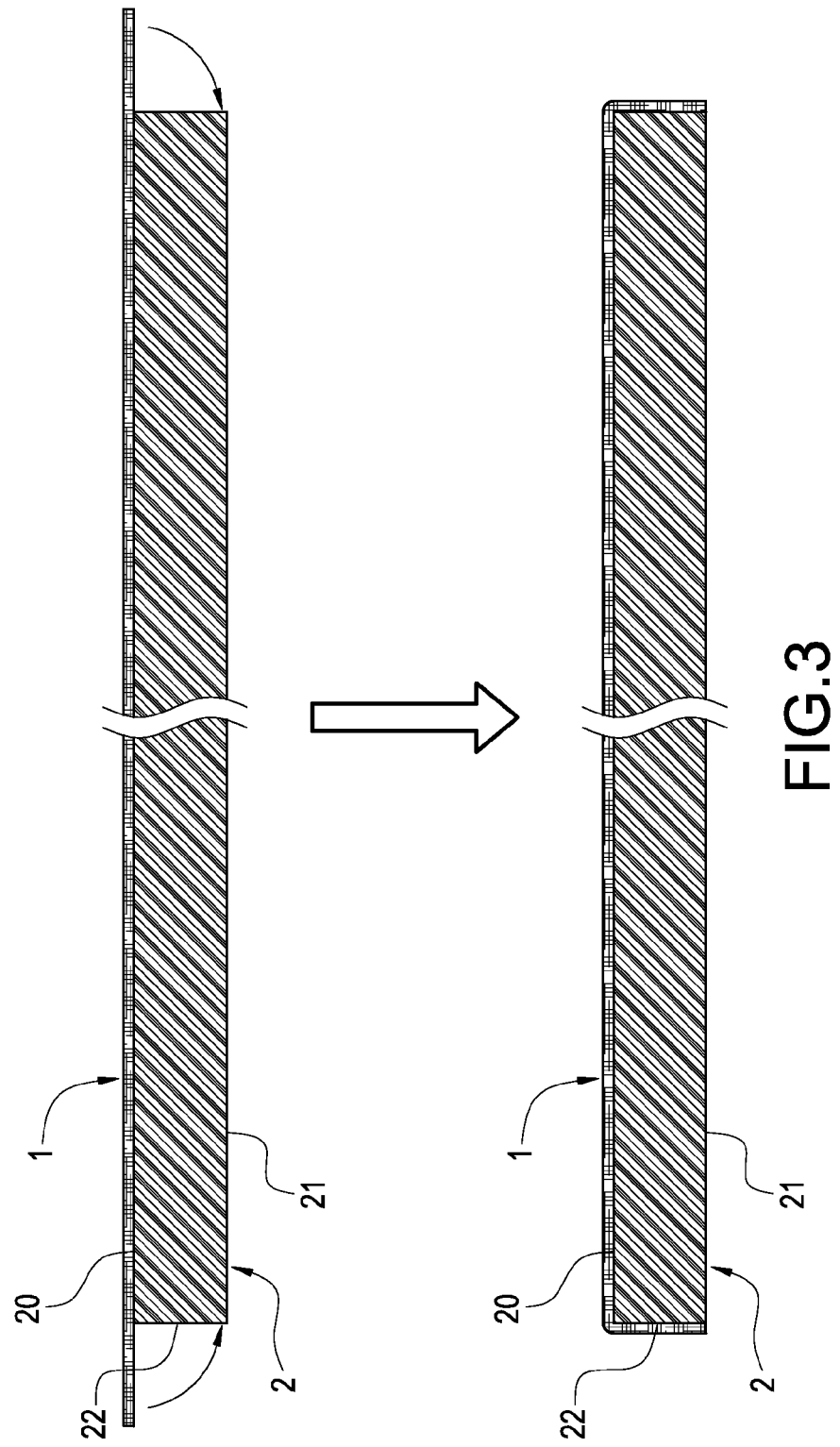
FIG. 3 is an aspect of having a bottom layer covered by the thermal compression fabric in the present invention.
Figure 4:
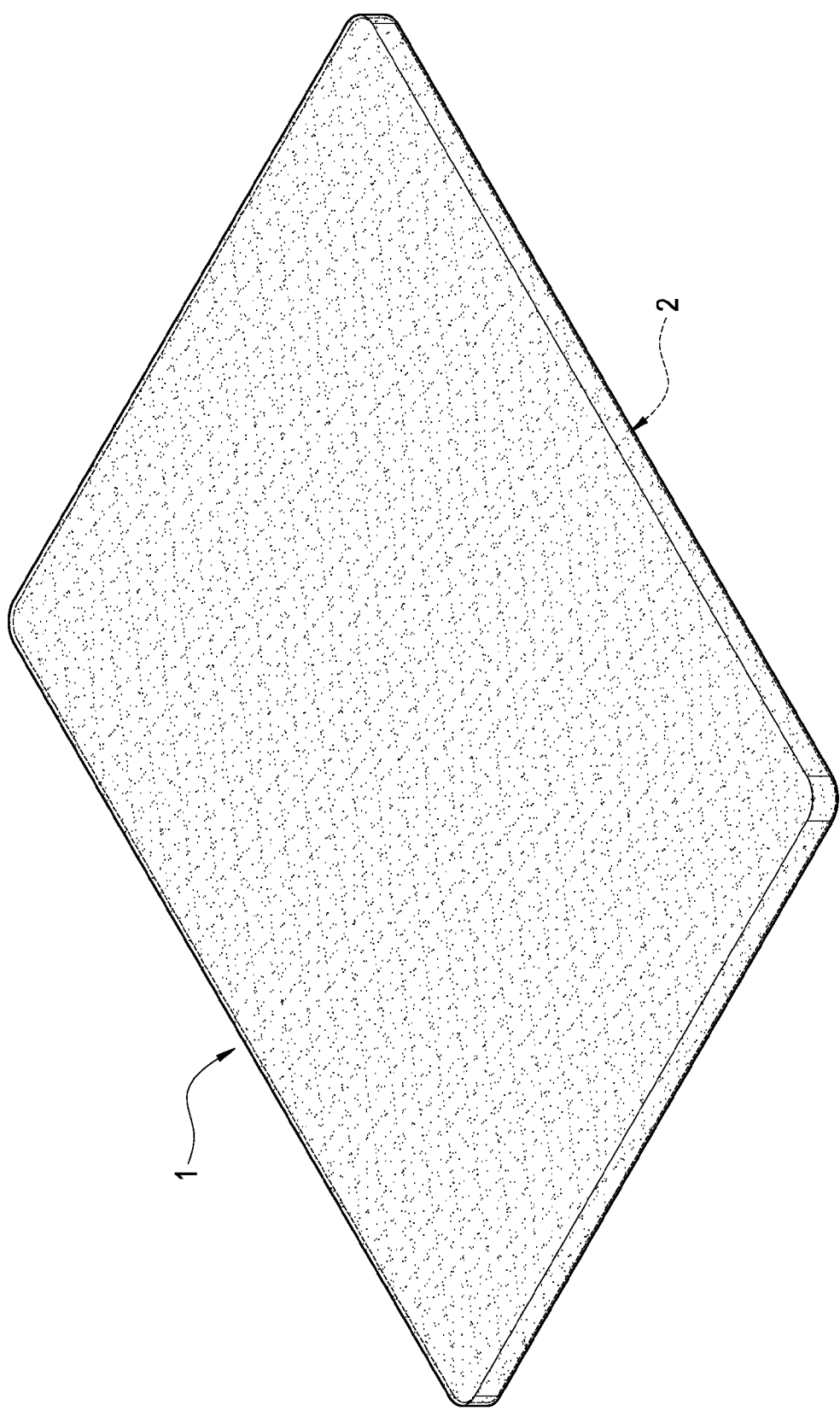
FIG. 4 is a perspective view of the present invention.

The fabric 1 is attached to the pad 2. Before attaching the fabric 1 to the pad 2, the fabric 2 is infiltrated with the adhesive silicon 3 as shown in FIG. 2, and then the fabric 2 is attached to the upper surface 20 of the pad 2. Meanwhile, as shown in FIG. 3, the surface area of the fabric 1 is larger than that of the upper surface 20 of the pad 2, and with the thermal contraction effect, the fabric 1 is completely attached to the upper surface 20 of the pad 2, and further the flange of the fabric 1 is folded along the edge 22 of the pad 2 to cover the edge 22. Thus, the fabric 1 completely covers the upper surface 20 and the edge 22 of the pad 2 as shown in FIG. 4 and thus avoids formation of deckle edge that may affect the appearance of the mouse pad. Meanwhile, because the fabric 1 completely covers the upper surface 20 and the edge 22 of the pad 2, the fabric 1 can be prevented from falling off due to squeezing due to pulling effect.

As the fabric 1 has thermal contraction property, the fabric 1 can be securely attached on the pad 2 via thermal contraction effect as the fabric 1 shrinks when subjected to heat and takes the shape of the pad 2. Furthermore, the pad 2 is comprised of a solid silicon, as the fabric 1 is infiltrated with the adhesive silicon 3, therefore, the fabric 1 and the pad 2 attach to each other with better adhering effect. In other words, the fabric 1 will not easily fall off from the pad 2.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A mouse pad, comprising
    a thermal contraction fabric knitted by yarn with a feature of thermal contraction polymer that has thermal contraction effect of stretching when subjected to heat, and
    a pad, having an upper surface and a lower surface corresponding to said upper surface, and an edge formed along a periphery of said upper and lower surfaces; said thermal contraction fabric is smoothly and flatly covering said upper and lower surfaces and said edge,
    wherein said thermal contraction fabric is securely attached on said pad via the thermal contraction effect as said thermal contraction fabric shrinks when subjected to the heat and takes a shape of said pad, and
    wherein said pad is made of a silicon material as said thermal contraction fabric is infiltrated with adhesive silicon so that said pad and said thermal contraction fabric attach to each other with an adhering effect.

* * * * *